(12) United States Patent
Suissa et al.

(10) Patent No.: US 11,544,858 B2
(45) Date of Patent: Jan. 3, 2023

(54) CAMERA-BASED ENHANCEMENT OF VEHICLE KINEMATIC STATE ESTIMATION

(71) Applicants: GM Global Technology Operations LLC, Detroit, MI (US); Technion—Research & Development Foundation Ltd, Haifa (IL)

(72) Inventors: Avshalom Suissa, Kiryat Ono (IL); Daniel Y. Rubin, Holon (IL)

(73) Assignees: GM GLOBAL TECHNOLOGY OPERATIONS LLC, Detroit, MI (US); TECHNION—RESEARCH & DEVELOPMENT FOUNDATION LTD., Haifa (IL)

( * ) Notice: Subject to any disclaimer, the term of this patent is extended or adjusted under 35 U.S.C. 154(b) by 523 days.

(21) Appl. No.: 16/690,827

(22) Filed: Nov. 21, 2019

(65) Prior Publication Data

US 2021/0158545 A1    May 27, 2021

(51) Int. Cl.
 *G06T 7/277* (2017.01)
 *G06T 7/70* (2017.01)
 (Continued)

(52) U.S. Cl.
 CPC .............. *G06T 7/277* (2017.01); *B60R 11/04* (2013.01); *B60W 40/11* (2013.01); *B60W 40/112* (2013.01); *B60W 40/114* (2013.01); *G06T 7/70* (2017.01); *B60W 2420/42* (2013.01); *B60W 2520/06* (2013.01); *G06T 2207/30248* (2013.01)

(58) Field of Classification Search
 CPC ........... B60W 2420/42; B60W 40/112; B60W 40/114; B60W 2520/18; B60W 2520/06; B60W 2520/105; B60W 2520/125; B60W 40/103; B60W 40/10; B60W 2520/14; B60W 40/11; B60W 2050/0031; B60W 2520/16; G06T 2207/30248; G06T 7/277; G06T 7/70; B60R 11/04
 See application file for complete search history.

(56) References Cited

U.S. PATENT DOCUMENTS 7,676,307 B2 * 3/2010 Schmitt ................... B60T 8/245
                                                          701/72
2017/0297562 A1 * 10/2017 Chen ................... B62D 5/0457
(Continued)

FOREIGN PATENT DOCUMENTS

DE       4124654 A1 *  1/1993  ........... G05D 1/0246
JP       H0727541    *  1/1995  ............. G01B 11/24

*Primary Examiner* — Pinalben Patel
(74) *Attorney, Agent, or Firm* — Cantor Colburn LLP

(57) ABSTRACT

Methods and systems implemented in a vehicle involve obtaining a single camera image from a camera arranged on the vehicle. The image indicates a heading angle $\psi_0$ between a vehicle heading x and a tangent line that is tangential to road curvature of a road on which the vehicle is traveling and also indicates a perpendicular distance $y_0$ from a center of the vehicle to the tangent line. An exemplary method includes obtaining two or more inputs from two or more vehicle sensors, and estimating kinematic states of the vehicle based on applying a Kalman filter to the single camera image and the two or more inputs to solve kinematic equations. The kinematic states include roll angle and pitch angle of the vehicle.

20 Claims, 4 Drawing Sheets

(51) Int. Cl.
*B60R 11/04* (2006.01)
*B60W 40/11* (2012.01)
*B60W 40/114* (2012.01)
*B60W 40/112* (2012.01)

(56) References Cited

U.S. PATENT DOCUMENTS

2018/0141543 A1* 5/2018 Krosschell ............ B60W 10/10
2019/0369222 A1* 12/2019 Oh ........................ G05D 1/101
2021/0331663 A1* 10/2021 Newton ................ B60W 10/18

* cited by examiner

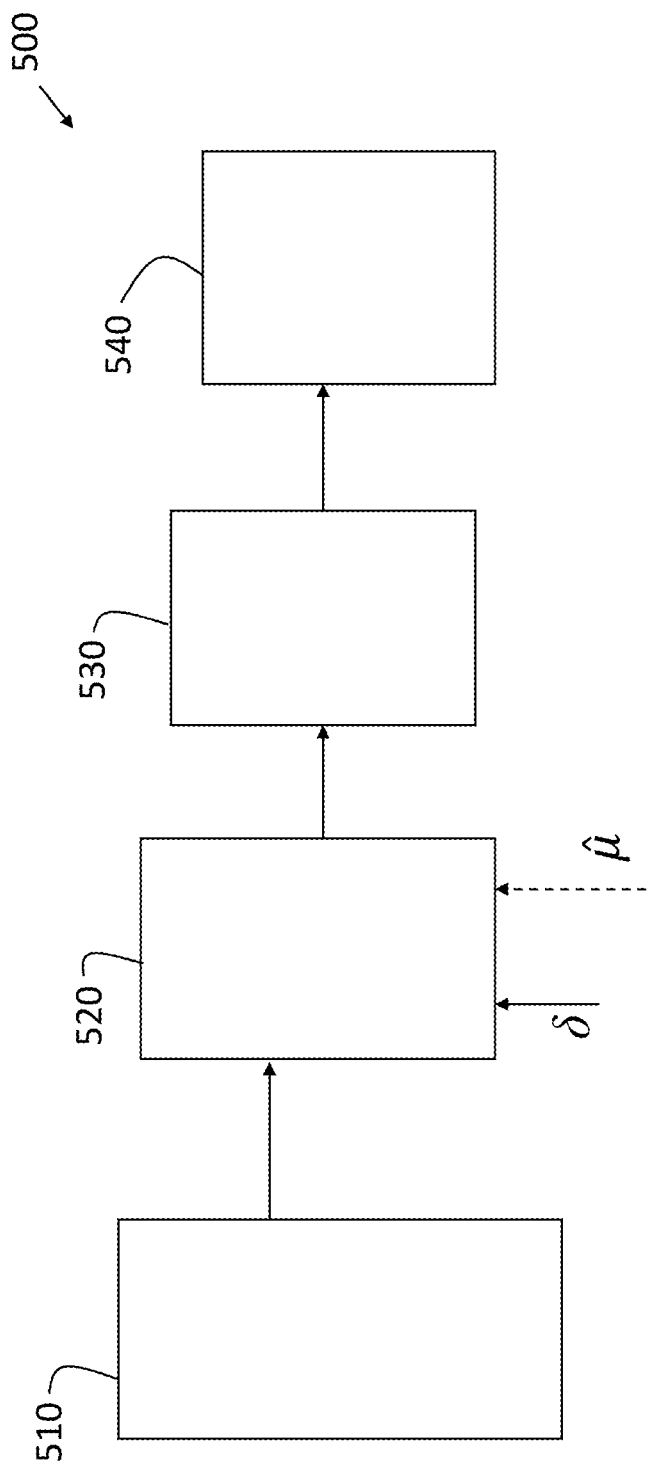

CAMERA-BASED ENHANCEMENT OF VEHICLE KINEMATIC STATE ESTIMATION

INTRODUCTION

The subject disclosure relates to a camera-based enhancement of vehicle kinematic state estimations.

Automated and semi-automated vehicles (e.g., automobiles, trucks, farm equipment, construction equipment, factory equipment) are controlled based on information about the environment and about the vehicle. Sensors such as radar systems, lidar systems, and cameras, for example, provide information about the environment around a vehicle. This information can include the presence of other vehicles or objects, for example. Sensors may also provide information about the behavior of the vehicle itself. This behavior includes the vehicle's kinematic state (e.g., longitudinal and lateral velocities, roll, pitch). Having information about the vehicle and its environment facilitates autonomous operation or semi-autonomous operation (e.g., collision avoidance, automated braking, adaptive cruise control). Prior approaches to estimating the kinematic state of a vehicle involve the inertial measurement unit (IMU) and odometer. Accordingly, it is desirable to provide a camera-based enhancement of vehicle kinematic state estimations.

SUMMARY

In one exemplary embodiment, a method implemented in a vehicle includes obtaining a single camera image from a camera arranged on the vehicle. The image indicates a heading angle $\psi_0$ between a vehicle heading x and a tangent line that is tangential to road curvature of a road on which the vehicle is traveling and also indicates a perpendicular distance $y_0$ from a center of the vehicle to the tangent line. The method also includes obtaining two or more inputs from two or more vehicle sensors, and estimating kinematic states of the vehicle based on applying a Kalman filter to the single camera image and the two or more inputs to solve kinematic equations. The kinematic states include roll angle and pitch angle of the vehicle.

In addition to one or more of the features described herein, the obtaining the two or more inputs includes obtaining acceleration components $a_x$, $a_y$ of the vehicle from an inertial measurement unit (IMU).

In addition to one or more of the features described herein, the obtaining the two or more inputs includes additionally obtaining roll rate $\omega_x$, pitch rate $\omega_y$, and yaw rate $\omega_z$, from the IMU.

In addition to one or more of the features described herein, the estimating the kinematic states includes estimating a velocity component $v_y$ of the vehicle based on the yaw rate $\omega_z$.

In addition to one or more of the features described herein, the obtaining the two or more inputs includes obtaining a velocity component $v_x$ of the vehicle from the odometer.

In addition to one or more of the features described herein, the obtaining the two or more inputs includes obtaining a position X, Y of the vehicle on a global frame from a global navigation satellite system (GNSS).

In addition to one or more of the features described herein, the estimating the kinematic states includes estimating global heading $\hat{\psi}$ based on the position X, Y of the vehicle.

In addition to one or more of the features described herein, the method also includes implementing a dynamic model using the kinematic states estimated using the single camera image and the two or more inputs and steering angle of the vehicle.

In addition to one or more of the features described herein, the method also includes obtaining tire forces from the dynamic model and performing a force calculation to determine external disturbances on the vehicle, wherein the external disturbances include crosswinds.

In addition to one or more of the features described herein, the method also includes compensating for the external disturbances.

In another exemplary embodiment, a system in a vehicle includes a camera arranged on the vehicle to obtain a single camera image. The image indicates a heading angle $\psi_0$ between a vehicle heading x and a tangent line that is tangential to road curvature of a road on which the vehicle is traveling and also indicates a perpendicular distance $y_0$ from a center of the vehicle to the tangent line. The system also includes a processor to obtain the single camera image, to obtain two or more inputs from two or more vehicle sensors, and to estimate kinematic states of the vehicle based on applying a Kalman filter to the single camera image and the two or more inputs to solve kinematic equations. The kinematic states include roll angle and pitch angle of the vehicle.

In addition to one or more of the features described herein, the processor obtains acceleration components $a_x$, $a_y$ of the vehicle from an inertial measurement unit (IMU) as the two or more inputs.

In addition to one or more of the features described herein, the processor obtains roll rate $\omega_x$, pitch rate $\omega_y$, and yaw rate $\omega_z$, from the IMU as additional ones of the two or more inputs.

In addition to one or more of the features described herein, the processor estimates the kinematic states by estimating a velocity component $v_y$, of the vehicle based on the yaw rate $\omega_z$.

In addition to one or more of the features described herein, the processor obtains a velocity component $v_x$ of the vehicle from the odometer as one of the two or more inputs.

In addition to one or more of the features described herein, the processor obtains a position X, Y of the vehicle on a global frame from a global navigation satellite system (GNSS) as the two or more inputs.

In addition to one or more of the features described herein, the processor estimates the kinematic states by estimating global heading $\hat{\psi}$ based on the position X, Y of the vehicle.

In addition to one or more of the features described herein, the processor implements a dynamic model using the kinematic states estimated using the single camera image and the two or more inputs and steering angle of the vehicle.

In addition to one or more of the features described herein, the processor obtains tire forces from the dynamic model and perform a force calculation to determine external disturbances on the vehicle. The external disturbances include crosswinds.

In addition to one or more of the features described herein, the processor compensates for the external disturbances.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 5 is a process flow of an exemplary method of applying camera-based enhancement of vehicle kinematic state estimations, according to one or more embodiments, to control a vehicle.

DETAILED DESCRIPTION

Figure 1:
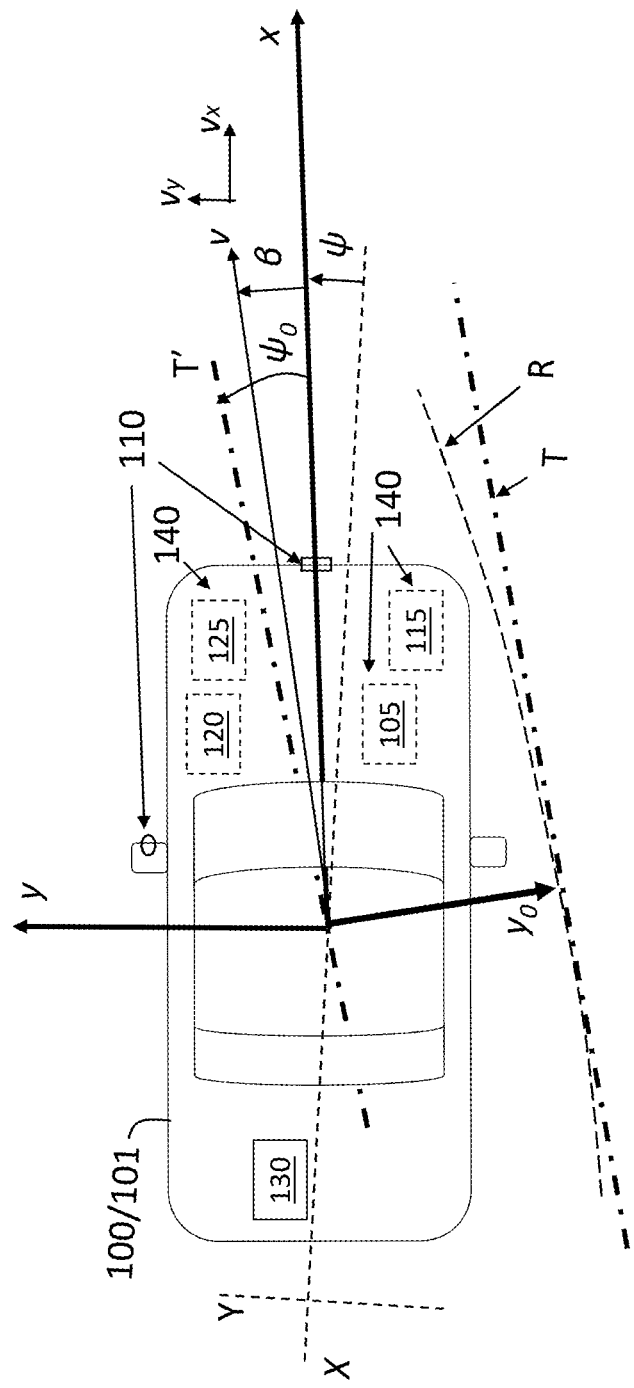
FIG. 1 is a block diagram showing aspects of camera-based enhancement of vehicle kinematic state estimation according to one or more embodiments.

The following description is merely exemplary in nature and is not intended to limit the present disclosure, its application or uses. It should be understood that throughout the drawings, corresponding reference numerals indicate like or corresponding parts and features.

As previously noted, information about vehicle behavior and vehicle environment are used to determine autonomous or semi-autonomous control over vehicle operation. Vehicle kinematic state provides information about vehicle behavior. Kinematic state refers to longitudinal and latitudinal velocity of the vehicle and roll and pitch angles, for example. Prior approaches to estimating kinematic state include using an IMU and odometer. The information obtained according to this approach may not properly convey vehicle behavior relative to the road. That is, estimated roll and pitch angles may not be obtained at all or may be inaccurate by corresponding with road banking or road inclination or with vehicle roll or pitch relative to the road alone rather than with a sum of both road-related and vehicle-related factors. Another approach uses optic flow based on obtaining sequential images. Embodiments of the systems and methods detailed herein relate to a camera-based enhancement of vehicle kinematic state estimations. Kinematics relative to a reference path are obtained with a single image rather than two or more sequential images.

In accordance with an exemplary embodiment, FIG. 1 is a block diagram showing aspects of camera-based enhancement of vehicle kinematic state estimation. The exemplary vehicle 100 shown in FIG. 1 is an automobile 101. The vehicle 100 may include one or more cameras 110 and other sensors 130 (e.g., radar system, lidar system). In addition to the exemplary arrangement shown for explanatory purposes, the cameras 110 and other sensors 130 may be located anywhere within or on the vehicle 100. In addition to the camera 110 and sensors 130 that provide information from outside the vehicle 100, known vehicle sensors 140 may provide information about the vehicle 100. For example, the odometer 125 determines velocity component $v_x$ of the vehicle 100 along the direction of travel. The IMU 105 tracks the acceleration components $a_x$, $a_y$ of the vehicle 100 and may additionally provide roll rate $\omega_x$, pitch rate $\omega_y$, and yaw rate $\omega_z$. If a global navigation satellite system (GNSS) 115 (e.g., global positioning system (GPS)) is also available as one of the vehicle sensors 140, it provides the position of the vehicle 100 on a global X and Y grid.

A reference path R indicates the road curvature that the vehicle 100 should be following. The reference path R may be a road center line (i.e., lane marker) or edge of the road, for example. A tangent T to the reference path R is also indicated and shown relative to the vehicle as T'. The x and y axes shown in FIG. 1 indicate the vehicle frame of reference. If a GNSS 115 is available, the global position X, Y of the vehicle 100, relative to a global frame of reference, is known. The vehicle position relative to the reference path R is obtained based on a camera 110 (e.g., the camera 110 at the front center of the vehicle 100). Specifically, the angle $\psi_0$ is between the vehicle heading x and the tangent line T' and the distance $y_0$ is the perpendicular distance from the center of the vehicle 100 to the tangent line T. The velocity v of the vehicle 100 is indicated. As previously noted, the velocity component $v_x$ along the direction of travel (i.e., along the x axis, as shown in FIG. 1) is determined by the odometer 125. The angle $\beta$ is the side slip angle. That is, the angle $\beta$ indicates the angle between the x axis and the velocity vector v. Put another way, the tangent of the angle $\beta$ is $v_y/v_x$, where the velocity component $v_y$ is along the y axis. The heading angle $\psi$ is the angle between the X axis, the global reference line, and the x axis, which is the vehicle 100 reference line.

Figure 3:
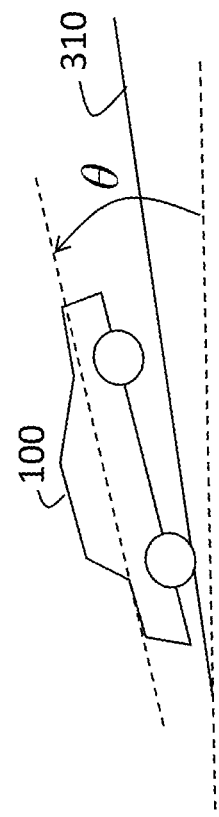
FIG. 3 illustrates an exemplary scenario that results in a pitch angle determined using camera-based enhancement of vehicle kinematic state estimation according to one or more embodiments.
Figure 2:
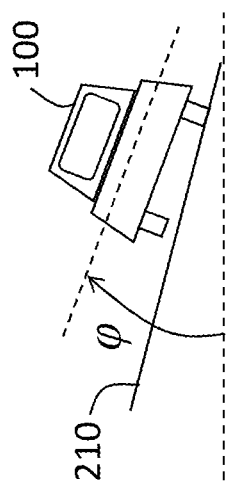
FIG. 2 illustrates an exemplary scenario that results in a roll angle determined using camera-based enhancement of vehicle kinematic state estimation according to one or more embodiments.

The vehicle 100 also includes a controller 120. The controller 120 may obtain and process data from the camera 110, sensors 130, and vehicle sensors 140 to obtain information about the vehicle 100 and its environment. This information includes a roll angle estimate $\hat{\varphi}$. Roll is illustrated in FIG. 2. The information also includes a pitch angle estimate $\hat{\theta}$. Pitch is illustrated in FIG. 3. The controller 120 may control one or more aspects of the operation of the vehicle 100 based on the information. According to one or more embodiments, the controller 120 performs vehicle kinematic state estimation that is enhanced based on the camera 110. The controller includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

FIG. 2 illustrates an exemplary scenario that results in a roll angle $\varphi$. The road 210 is banked (i.e., curves up on one edge), as shown in FIG. 2. In addition the vehicle 100 is inclined on one side with respect to the road 210. The roll angle $\varphi$ is a sum of the banking of the road 210 and the incline of the vehicle 100 relative to the road 210. FIG. 3 illustrates an exemplary scenario that results in a pitch angle $\theta$. The road 310 is inclined (i.e., slopes up), as shown in FIG. 3. In addition, the vehicle 100 is inclined with respect to the road 310 in the front. The pitch angle $\theta$ is a sum of the inclination of the road 310 and the incline of the vehicle 100 relative to the road 310. The controller 120 obtains a roll angle estimate $\hat{\varphi}$, a pitch angle estimate $\hat{\theta}$, and velocity component estimates $\hat{v_x}$ and $\hat{v_y}$ along the x and y axes, respectively. If a global X, Y reference is available through a GNSS 115, the controller 120 also obtains global position estimates $\hat{X}$ and $\hat{Y}$ along with heading angle estimate $\hat{\psi}$. The controller 120 implements a Kalman filter to solve kinematic equations, as detailed with reference to FIG. 4.

Figure 4:
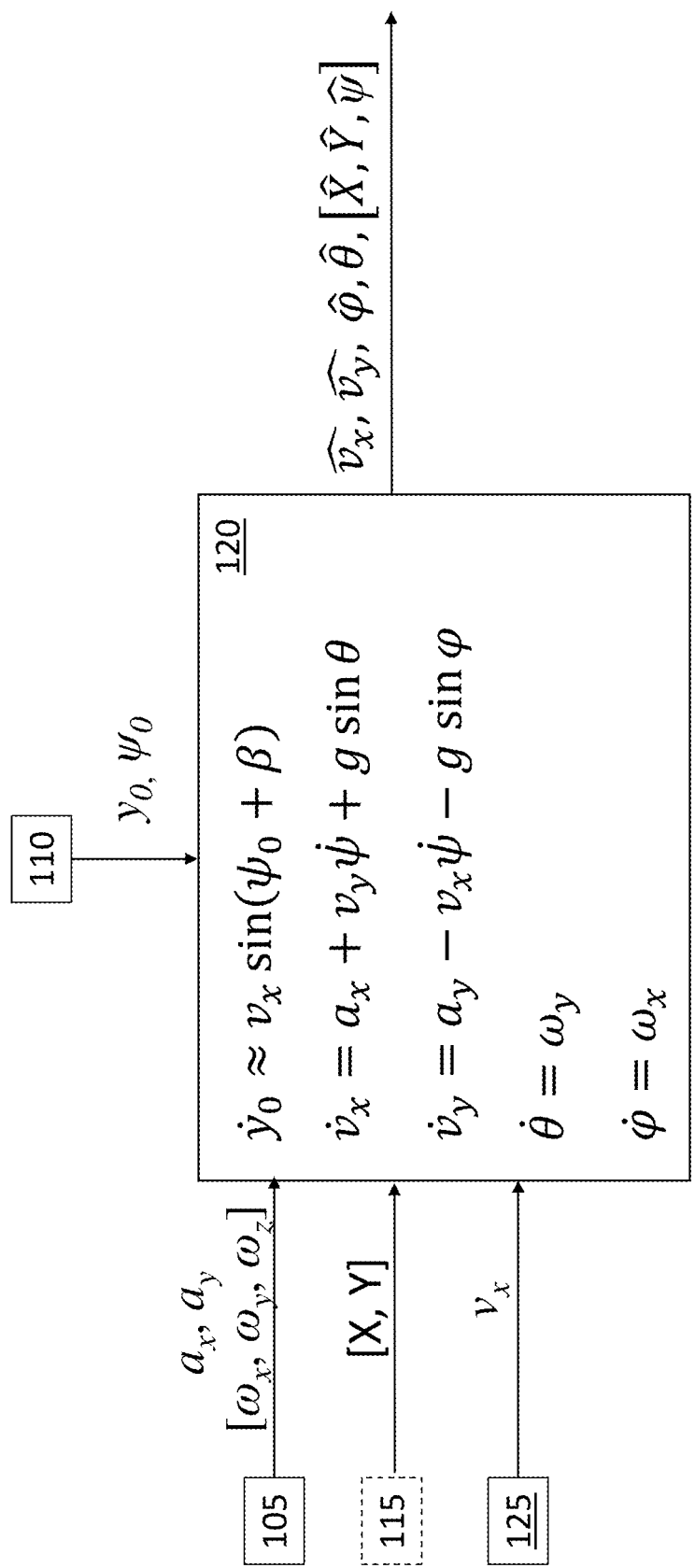
FIG. 4 is a block diagram indicating the inputs and outputs involved in camera-based enhancement of vehicle kinematic state estimations according to one or more embodiments.

FIG. 4 is a block diagram indicating the inputs and outputs involved in camera-based enhancement of vehicle kinematic state estimations according to one or more embodiments. Inputs and outputs shown in brackets are optional and may not be available, as further discussed. The kinematic equations are indicated as being solved by the controller 120. A Kalman filter uses observable states (i.e., inputs to the controller 120) to obtain unobservable states in the kinematic equations. The Kalman filter is a multi-rate Kalman filter that takes into account the different rates at which different vehicle sensors 140 provide data (i.e., the observable states) to the controller 120. The controller obtains the angle $\psi_0$ and the distance $y_0$ from the camera 110. As previously noted, one image is sufficient. Even though the camera 110 may be located at the front of the vehicle 100 to be forward-facing, for example, information may be transformed to the center of the vehicle 100, for example, to obtain the distance $y_0$ from the center of the vehicle 100 to the tangent line T. From the IMU 105, the controller 120 obtains acceleration components $a_x$, $a_y$ of the vehicle 100 and may additionally obtain roll rate $\omega_x$, pitch rate $\omega_y$, and yaw rate $\omega_z$. If the vehicle sensors 140 include a GNSS 115, the controller 120 obtains a global position X, Y of the vehicle 100 and a global frame of reference. From the odometer 125, the controller obtains the velocity component $v_x$ along the direction of travel.

Each of the kinematic equations is discussed. Generally, the "•" above a parameter indicates rate (e.g., $\dot{\theta}$ indicates pitch rate) while, as previously indicated, "^" above a parameter indicates an estimate (e.g., $\hat{\theta}$ indicates pitch estimate). For example, $\dot{\theta}$ indicates pitch rate, and $\hat{\theta}$ indicates pitch estimate determined using the Kalman filter and the observable states included in the equation for $\dot{v}_x$ in FIG. 4. The first kinematic equation relates to rate of displacement and is:

$$\dot{y}_0 \approx v_x \sin(\psi_0 + \beta) \qquad [EQ. 1]$$

As previously noted, velocity component $v_x$ along the direction of travel is an observable state provided by the odometer 125, and the angle $\psi_0$ and the distance $y_0$ are provided by the camera 110. Thus, the side slip angle $\beta$ is determined using EQ. 1. As indicated in FIG. 1, the angle $\beta$ is the angle between the x axis (of the vehicle 100 frame of reference) and the velocity vector v. While the velocity component $v_x$ is an input, as previously noted, the angle $\beta$ may be used to determine the velocity component $v_y$ along they axis of the vehicle 100 frame of reference.

The second equation shown in FIG. 4 is:

$$\dot{v}_x = a_x + v_y \dot{\psi} + g \sin \theta \qquad [EQ. 2]$$

In EQ. 2, g is the acceleration due to gravity. As previously noted, the velocity component $v_x$ is an input (i.e., observable) obtained from the odometer 125 and the acceleration component $a_x$ is obtained from the IMU 105. If the IMU 105 additionally provides pitch rate $\omega_y$ ($\dot{\theta}$) and yaw rate $\omega_z$, then pitch $\theta$ (time derivative of pitch rate $\dot{\theta}$) and heading rate $\dot{\psi}$ (same as yaw rate $\omega_z$) are available as observable values, as well. The velocity component $v_y$ may be solved by the Kalman filter.

The third equation in FIG. 4 is:

$$\dot{v}_y = a_y - v_x \dot{\psi} - g \sin \varphi \qquad [EQ. 3]$$

As previously noted, the acceleration component $a_y$ is obtained from the IMU 105, and the velocity component $v_x$ is obtained from the odometer 125. If the IMU 105 additionally provides roll rate $\omega_x$ ($\dot{\varphi}$) and yaw rate $\omega_z$, then roll $\varphi$ (time derivative of roll rate $\dot{\varphi}$) and heading rate $\dot{\psi}$ (same as yaw rate $\omega_z$) are available as observables, as well. As noted with reference to EQ. 2, the velocity component $v_y$ may be solved by the Kalman filter. If the roll rate $\omega_x$ ($\dot{\varphi}$) and pitch rate $\omega_y$ ($\dot{\theta}$) are provided by the IMU 105, then the Kalman filter will converge more quickly in EQS. 2 and 3. The yaw rate $\omega_z$ is generally available. However, even if the IMU 105 does not provide the roll rate $\omega_x$, pitch rate $\omega_y$, EQS. 2 and 3 may be used with zero as the initial values for roll rate $\omega_x$ ($\dot{\varphi}$) and pitch rate $\omega_y$ ($\dot{\theta}$).

If the GNSS 115 information in the global frame of reference is available and the IMU 105 provides roll rate $\omega_x$, pitch rate $\omega_y$, and yaw rate $\omega_z$, in addition to the acceleration components $a_x$, $a_y$, the following additional equations may be solved:

$$\dot{X} = v_x \sin \psi - v_y \cos \psi \qquad [EQ. 4]$$

$$\dot{Y} = v_x \cos \psi + v_y \sin \psi \qquad [EQ. 5]$$

$$\dot{\psi} = \omega_z \qquad [EQ. 6]$$

As previously noted, the controller 120 obtaining additional information from the IMU 105 facilitates estimation of heading angle $\psi$ directly from the yaw rate $\omega_z$ as in EQ. 4. In addition, from the heading angle $\psi$ and velocity components $v_x$, $v_x$, the displacement of the vehicle 100 based on global position $\dot{X}$ and $\dot{Y}$ can be determined according to EQS. 4 and 5.

FIG. 5 is a process flow of an exemplary method 500 of applying camera-based enhancement of vehicle kinematic state estimations, according to one or more embodiments, to control a vehicle 100. The processes shown in FIG. 5 may all be implemented by the controller 120 or by a combination of the controller 120 and other processors of the vehicle 100. At block 510, obtaining inputs and determining kinematic states includes the inputs and kinematic equations discussed with reference to FIG. 4. The kinematic states (e.g., pitch $\theta$, roll $\varphi$) are provided along with steering angle $\delta$ and, optionally, an estimate of friction $\hat{\mu}$ to the process at block 520. At block 520, implementing a dynamic model results in an output of tire forces on the tires of the vehicle 100. At block 530, performing a force calculation results in a determination of external disturbances. At block 540, the external disturbances determined at block 530 are used to implement compensating for external disturbances (e.g., crosswinds) that the vehicle 100 is subjected to.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method implemented in a vehicle, comprising:
   obtaining, using a processor, a single camera image from a camera arranged on the vehicle, the image indicating a heading angle $\psi_0$ between a vehicle heading x of the vehicle and a tangent line that is tangential to road curvature of a road on which the vehicle is traveling and also indicating a perpendicular distance $y_0$ from a center of the vehicle to the tangent line;
   obtaining, using the processor, two or more inputs from two or more vehicle sensors of the vehicle;
   estimating, using the processor, kinematic states of the vehicle based on applying a Kalman filter to the single camera image and the two or more inputs to solve kinematic equations, wherein the kinematic states include roll angle and pitch angle of the vehicle; and implementing autonomous or semi-autonomous control of the vehicle based on the kinematic states.

2. The method according to claim 1, wherein the obtaining the two or more inputs includes obtaining acceleration components $a_x$, $a_y$ of the vehicle from an inertial measurement unit (IMU).

3. The method according to claim 2, wherein the obtaining the two or more inputs includes additionally obtaining roll rate $\omega_x$, pitch rate $\omega_y$, and yaw rate $\omega_z$ from the IMU.

4. The method according to claim 3, wherein the estimating the kinematic states includes estimating a velocity component $v_y$ of the vehicle based on the yaw rate $\omega_z$.

5. The method according to claim 1, wherein the obtaining the two or more inputs includes obtaining a velocity component $v_x$ of the vehicle from an odometer.

6. The method according to claim 1, wherein the obtaining the two or more inputs includes obtaining a position X, Y of the vehicle on a global frame from a global navigation satellite system (GNSS).

7. The method according to claim 6, wherein the estimating the kinematic states includes estimating global heading $\hat{\psi}$ based on the position X, Y of the vehicle.

8. The method according to claim 1, further comprising implementing a dynamic model using the kinematic states estimated using the single camera image and the two or more inputs and steering angle of the vehicle.

9. The method according to claim 8, further comprising obtaining tire forces from the dynamic model and performing a force calculation to determine external disturbances on the vehicle, wherein the external disturbances include crosswinds.

10. The method according to claim 9, further comprising compensating for the external disturbances.

11. A system in a vehicle, the system comprising:
a camera arranged on the vehicle and configured to obtain a single camera image, the image indicating a heading angle $\psi_0$ between a vehicle heading x and a tangent line that is tangential to road curvature of a road on which the vehicle is traveling and also indicating a perpendicular distance $y_0$ from a center of the vehicle to the tangent line; and
a processor configured to obtain the single camera image, to obtain two or more inputs from two or more vehicle sensors of the vehicle, to estimate kinematic states of the vehicle based on applying a Kalman filter to the single camera image and the two or more inputs to solve kinematic equations, wherein the kinematic states include roll angle and pitch angle of the vehicle; and to implement autonomous or semi-autonomous control of the vehicle based on the kinematic states.

12. The system according to claim 11, wherein the processor is configured to obtain acceleration components $a_x$, $a_y$ of the vehicle from an inertial measurement unit (IMU) as the two or more inputs.

13. The system according to claim 12, wherein the processor is additionally configured to obtain roll rate $\omega_x$, pitch rate $\omega_y$, and yaw rate $\omega_z$ from the IMU as additional ones of the two or more inputs.

14. The system according to claim 13, wherein the processor is configured to estimate the kinematic states by estimating a velocity component $v_y$ of the vehicle based on the yaw rate $\omega_z$.

15. The system according to claim 11, wherein the processor is configured to obtain a velocity component $v_x$ of the vehicle from an odometer as one of the two or more inputs.

16. The system according to claim 11, wherein the processor is configured to obtain a position X, Y of the vehicle on a global frame from a global navigation satellite system (GNSS) as the two or more inputs.

17. The system according to claim 16, wherein the processor is configured to estimate the kinematic states by estimating global heading $\hat{\psi}$ based on the position X, Y of the vehicle.

18. The system according to claim 11, wherein the processor is additionally configured to implement a dynamic model using the kinematic states estimated using the single camera image and the two or more inputs and steering angle of the vehicle.

19. The system according to claim 18, wherein the processor is additionally configured to obtain tire forces from the dynamic model and perform a force calculation to determine external disturbances on the vehicle, wherein the external disturbances include crosswinds.

20. The system according to claim 19, wherein the processor is further configured to compensate for the external disturbances.

* * * * *